United States Patent
Smith

[19]

[11] Patent Number: 6,098,900
[45] Date of Patent: Aug. 8, 2000

[54] PORTABLE SPRINKLER DISTRIBUTION ASSEMBLY

[76] Inventor: Eugene Smith, 5824 58th St. Ct., Tampa, Fla. 33619

[21] Appl. No.: 09/219,356

[22] Filed: Dec. 23, 1998

[51] Int. Cl.[7] .................................................. B05B 15/06
[52] U.S. Cl. .................. 239/201; 239/200; 239/207; 239/271; 239/273; 239/276; 239/281; 239/67
[58] Field of Search ............................. 239/67, 200, 201, 239/203, 207, 271, 273, 276, 281; 111/118; 405/36, 37, 39, 40, 41

[56] References Cited

U.S. PATENT DOCUMENTS

| | | | |
|---|---|---|---|
| 445,510 | 1/1891 | Black | 405/36 X |
| 1,769,944 | 7/1930 | Crisp | 239/281 X |
| 2,595,598 | 5/1952 | Morton | 239/271 X |
| 2,614,887 | 10/1952 | Shields | 239/281 X |
| 2,790,403 | 4/1957 | Larsen | 405/40 X |
| 3,035,777 | 5/1962 | Bodell et al. | 239/207 X |
| 3,351,290 | 11/1967 | Baldwin | 239/201 X |
| 4,153,380 | 5/1979 | Hartman | 405/39 |
| 4,156,396 | 5/1979 | Konucik | 239/207 X |
| 4,705,218 | 11/1987 | Daniels | 239/271 |
| 4,878,781 | 11/1989 | Gregory et al. | 405/36 X |
| 5,021,939 | 6/1991 | Pulgiese | 239/67 X |

*Primary Examiner*—Andres Kashnikow
*Assistant Examiner*—Robin D. Evans
*Attorney, Agent, or Firm*—Alfred F. Hoyte, Jr.

[57] ABSTRACT

An automatic water sprinkler assembly is provided. A main conduit is connected to a source of water pressure, at least a portion of the main conduit is buried underground with a releasably connected vertical portion extending above ground. A main horizontal feeder conduit having at least four vertical output conduits is connected to a source of electrical power for operating electrically controllable valves associated with each of said at least four vertical output conduits for selectively controlling fluid flow therethrough. Each of the four vertical output conduits has an end portion terminating above ground and releasably connected to a primarily horizontally extending discharge conduit. The vertical portion of the main conduit, the horizontal feeder, and the vertical output conduits are all releasably connected above ground so that the entire distribution assembly is portable. Alternatively, the valves may be manually operated.

2 Claims, 3 Drawing Sheets

PORTABLE SPRINKLER DISTRIBUTION ASSEMBLY

BACKGROUND OF THE INVENTION

1. Field of the Invention

The present invention relates to sprinkler systems and particularly to underground automatic sprinkler assemblies.

Thus it can be seen that the potential fields of use for this invention are myriad and the particular preferred embodiment described herein is in no way meant to limit the use of the invention to the particular field chosen for exposition of the details of the invention.

A comprehensive listing of all the possible fields to which this invention may be applied is limited only by the imagination and is therefore not provided herein. Some of the more obvious applications are mentioned herein in the interest of providing a full and complete disclosure of the unique properties of this previously unknown general purpose article of manufacture. It is to be understood from the outset that the scope of this invention is not limited to these fields or to the specific examples of potential uses presented hereinafter.

2. Description of the Prior Art

U.S. Pat. No. 4,162,041 to Hane there discloses a liquid sprinkling device employing connection sockets and fluid delivery pipes of varying diameters. The sub-pipe 3 has a plurality of spurting holes formed therein. The main pipe 2 has an outer diameter of 18 millimeters and an inner diameter of 15 millimeters, and the sub-pipe 3 has an outer diameter of 11 millimeters and an inner diameter of 8 millimeters, both of these pipes are 2 meters in length. Contrary to the Hane patent of the instant invention defines a fluid input assembly connected above ground to a distribution assembly characterized by upwardly extending vertically spaced apart pipes connected to a horizontal pipe. The horizontal pipe has formed therein openings for the attachment of downwardly extending pipes to be connected to the associated in - ground sprinkler pipes that are tapered along their length such that the fluid pressure therein is substantially constant.

U.S. Pat. No. 3,351,290 issued to Baldwin discloses a lawn treating system having multiple components located in a sprinkler feed line. The mechanism shown in the drawings is shown above ground level and includes a variety of valves used to control the spraying of fertilizers and other chemicals utilized in a sprinkler system. Coupling unions 10, 12 interrupt the sprinkler feed line 14 for installation of the body 50 of the mixing gauge tank 52. Contrary to the Baldwin patent the instant invention teaches the connectors for the water supply are located above ground for easy access when the distribution assembly is desired to be moved to an alternate location. The connectors for the downwardly extending pipes from the horizontal pipe to the underground ground pipes maintaining fluid pressure are also located above ground such that the sprinkler terminal may moved to an alternate section of the area to be treated. The sprinkler of the instant invention may be operated both manually and electrically.

In U.S. Pat. No. 3,865,309 to Greenhalgh there is disclosed a sprinkling fence constructed from one or more units having at least one rail connected to at least one upright post. An anchor peg, which has a post receiving socket provided with a spike-shaped, ground engaging element, secures the post in an upright position. Contrary to the patent to Greenhalgh the sprinkler assembly of the instant invention discloses underground pipes attached to the upstanding distribution assembly which is detachably secured to the sprinkler system.

SUMMARY OF THE INVENTION

The Invention relates to an automatic water sprinkler assembly. A main conduit is connected to a source of water pressure, at least a portion of the main conduit is buried underground with a releasably connected vertical portion extending above ground. A main horizontal feeder conduit having at least four vertical output conduits is connected to a source of electrical power for operating electrically controllable valves associated with each of said at least four vertical output conduits for selectively controlling fluid flow therethrough. Each of the four vertical output conduits has an end portion terminating above ground and releasably connected to a primarily horizontally extending discharge conduit. The vertical portion of the main conduit, the horizontal feeder, and the vertical output conduits are all releasably connected above ground so that the entire distribution assembly is portable. Alternatively, the valves may be manually operated.

Accordingly, it is an object of the invention to provide an improved water sprinkler assembly.

It is a major object of the invention to provide an improved water sprinkler assembly having a portable distribution assembly.

It is another object

Finally, it is a general goal of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

The present invention meets or exceeds all the above objects and goals. Upon further study of the specification and appended claims, further objects and advantages of this invention will become apparent to those skilled in the art.

DETAILED DESCRIPTION OF THE PREFERRED EMBODIMENTS

The invention relates to a sprinkler system and a distribution assembly therefor. Referring now to FIGS. 1–4, the system, generally indicated by the numeral 10, has three main components, the main supply 12, the portable distribution assembly 14, and the output conduits 16. The main supply 12, usually associated with a house or other structure, must have sufficient water pressure to output a stream of water at least several feet from all of the spigots of all of the output conduits 16. Measurements of the available water pressure and the total length of the output conduits and all of the other parameters needed to make the appropriate calculations are well known in the art.

Figure 1:
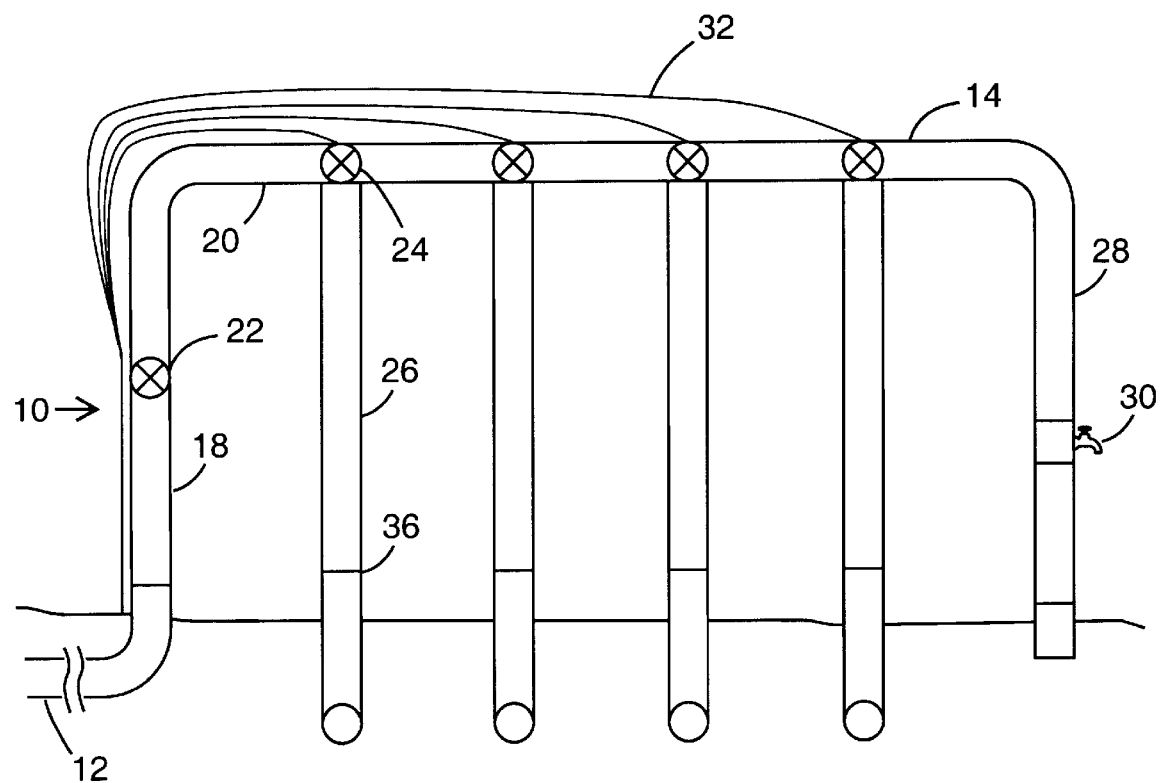
FIG. 1 is a side view of the distribution assembly of the sprinkler system of the present invention.
Figure 2:
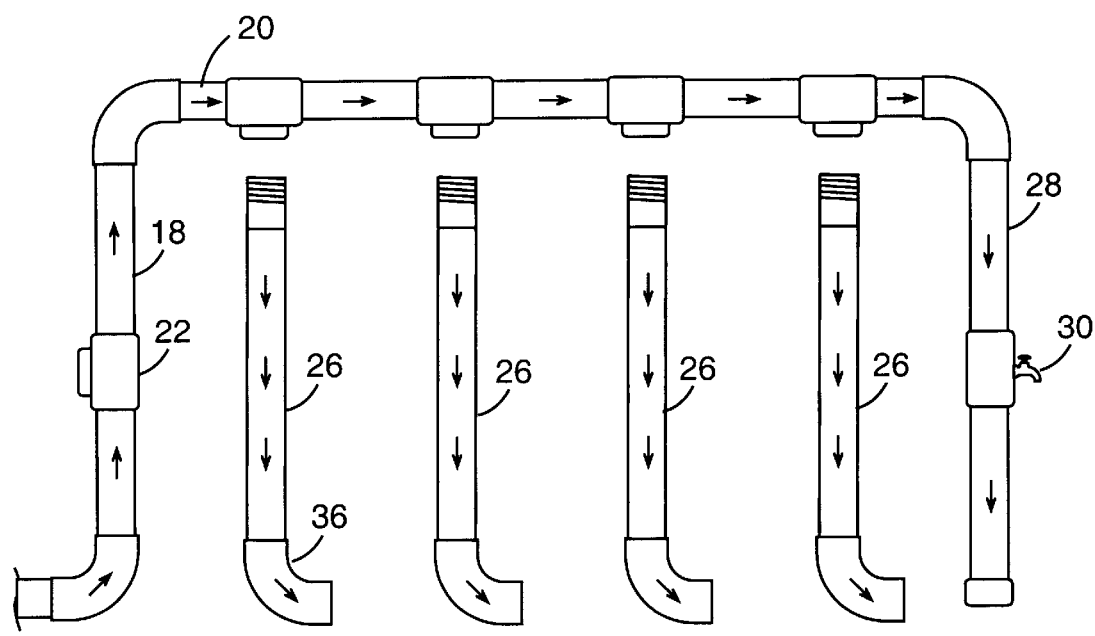
FIG. 2 is an exploded isometric view of the distribution assembly shown in FIG. 1.

Referring particularly to FIGS. 1 and 2, the distribution assembly 14 has a main vertical conduit 18, and a main horizontal conduit 20. The main vertical conduit 18 has a main shutoff valve 22 for shutting off water to the system. The main horizontal conduit 20 has a plurality of valves 24 for selectively controlling water flow to the vertical feeder conduits 26. Preferably the valves 24 are electrical and controllable from a remote location. An additional vertical conduit 28 has an outlet 30 to which a hose or sprinkler may be connected.

In the preferred embodiment, the electrical valves 24 are controllable by a timer circuit (not shown) which allows for periodic sprinkling activity. The circuit can be responsive to operator input, or to sensing the ambient light conditions so as to cause sprinkling to occur at the onset of nightfall or daybreak. A plurality of wires 32 which may run along the main conduits and into the house or other associated structure.

Also in the preferred embodiment, the distribution assembly 14 can be disassembled for storage or for movement to another area for distributing water flow to another set of output conduits 16. This capability results in a significant cost saving to the consumer since the distribution assembly 14 may be used in more than one location. Any leaks which may develop may be easily detected and repaired. Also, in cold weather climates, the assembly 14 may be stored to prevent damage due to freezing or other cold weather problems. Preferably the distribution assembly is made of PVC or other plastic to reduce cost and weight. A plurality of connectors 36, which may be quick disconnect connectors such as the bayonet type, are connected to the vertical conduits 18, 26, 28, allow for disconnection of the distribution assembly 14. The assembly 14 may be further broken down as shown in FIG. 2.

Figure 3:
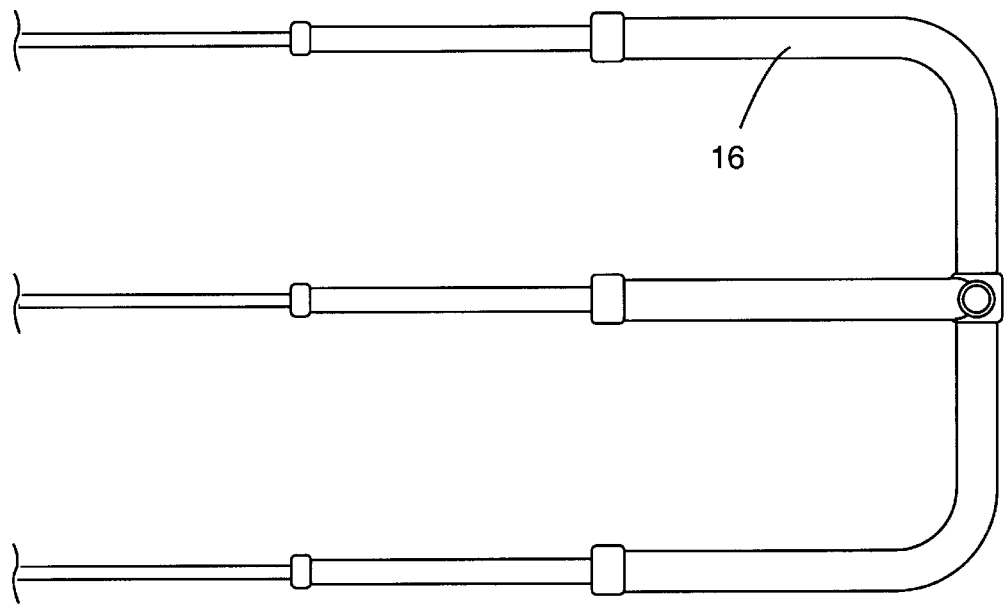
FIG. 3 is a plan view of one branch of the sprinkler system of the present invention.
Figure 4:
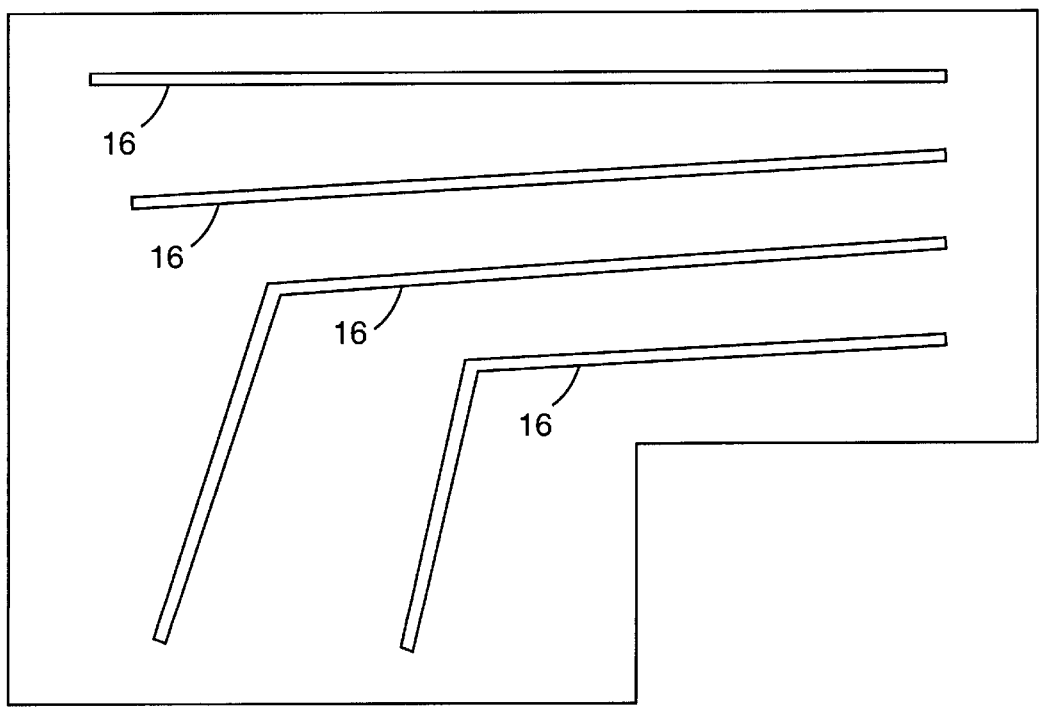
FIG. 4 is a plan view of the sprinkler system detailing a possible arrangement for the output conduits of the system.

FIGS. 3 and 4 show possible arrangements for the output conduits 16. The arrangement in FIG. 3 would be useful for extremely large area distribution. Each of the vertical feeder 26 is connected to three output conduits. Each of the output conduits 16 is comprised of a series of successively smaller diameter conduits to maintain constant water pressure. FIG. 4 shows an arrangement for use with an irregularly shaped yard. It should be noted that with both arrangements, the vertical feeder conduits 26 are connected to the output conduits 16 which are then laid out as required to distribute water as needed over the entire surface area of the lawn. Instead of varying the spacing or number of the vertical feeder conduits, the layout of the output conduits 16 is varied thus ensuring the interchangeability of the distribution assembly.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims:

What is claimed is:

1. An automatic water sprinkler assembly comprising:

a source of water pressure;

a main conduit connected to said source of water pressure, at least a portion of said main conduit buried underground, said main conduit having a vertical component extending above ground, said vertical component having a main shutoff valve disposed therein;

a main horizontal feeder conduit connected to said main conduit and having at least four vertical output conduits said main horizontal feeder conduit and said vertical output conduit extending above around level; said feeder conduit having a source of electrical power positioned adjacent thereto, said source of electrical power operably connected to valves associated with each of said at least four vertical output conduits for selectively controlling fluid flow therethrough;

each of said four vertical output conduits having an end portion terminating above ground and releasably connected to at least one primarily horizontally extending discharge conduit, said discharge conduit extending beneath ground;

wherein said main horizontal feeder conduit and said vertical output conduits can be easily disconnected from said main conduit for transportation and storage.

2. The assembly of claim 1 wherein said discharge conduits have a plurality of sections, each of said sections having discharge openings, said sections being of successively smaller diameter.

* * * * *